(12) United States Patent
Fang

(10) Patent No.: US 10,884,261 B2
(45) Date of Patent: Jan. 5, 2021

(54) GLASSES-FREE THREE DIMENSIONAL DISPLAY PANEL, MANUFACTURING METHOD THEREOF, AND GLASSES-FREE THREE DIMENSIONAL DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventor: Zhixiang Fang, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 162 days.

(21) Appl. No.: 15/678,313

(22) Filed: Aug. 16, 2017

(65) Prior Publication Data

US 2018/0074333 A1 Mar. 15, 2018

(30) Foreign Application Priority Data

Sep. 12, 2016 (CN) .......................... 2016 1 0819708

(51) Int. Cl.
*G02B 30/26* (2020.01)
*G02F 1/1335* (2006.01)
*G02F 1/1333* (2006.01)
*G02F 1/1343* (2006.01)
*G06F 3/041* (2006.01)

(52) U.S. Cl.
CPC ......... *G02B 30/26* (2020.01); *G02F 1/13338* (2013.01); *G02F 1/13439* (2013.01); *G02F 1/133504* (2013.01); *G02F 1/134363* (2013.01); *G06F 3/0412* (2013.01); *G06F 2203/04111* (2013.01)

(58) Field of Classification Search
CPC ... G02B 27/225; G02B 30/26; G02F 1/13338; G02F 1/13439; G02F 1/134363; G02F 1/133504
See application file for complete search history.

(56) References Cited

U.S. PATENT DOCUMENTS

| | | | | |
|---|---|---|---|---|
| 2008/0218459 A1* | 9/2008 | Kim | .................. | G02F 1/134309 345/87 |
| 2013/0300705 A1* | 11/2013 | Goo | ..................... | G06F 3/0412 345/174 |
| 2014/0063385 A1* | 3/2014 | Yang | ..................... | G06F 3/0446 349/15 |

* cited by examiner

*Primary Examiner* — Michael H Caley
*Assistant Examiner* — Agnes Dobrowolski
(74) *Attorney, Agent, or Firm* — Calfee, Halter & Griswold LLP

(57) ABSTRACT

A glasses-free three dimensional display panel, a manufacturing method thereof, and a glasses-free three dimensional display device are disclosed. The glasses-free three dimensional display panel includes a display panel and a grating panel disposed on a light exiting side of the display panel, wherein the grating panel includes a first substrate and a second substrate disposed opposite to each other, and a liquid crystal layer disposed between the first substrate and the second substrate; and the first substrate includes a first base substrate and a first electrode pattern disposed on the first base substrate, the first electrode pattern includes at least two first gating electrodes, and the second substrate includes a second base substrate and at least two second gating electrodes disposed on the second base substrate.

17 Claims, 5 Drawing Sheets

Prior Art

GLASSES-FREE THREE DIMENSIONAL DISPLAY PANEL, MANUFACTURING METHOD THEREOF, AND GLASSES-FREE THREE DIMENSIONAL DISPLAY DEVICE

CROSS-REFERENCE TO RELATED APPLICATIONS

The present application claims priority to Chinese Patent Application No. 20161081.9708.9 filed Sep. 12, 2016, the entire contents of which are incorporated herein by reference.

TECHNICAL FIELD

The present disclosure relates to the field of display technology, and more particularly to a glasses-free three dimensional display panel, a manufacturing method thereof, and a glasses-free three dimensional display device.

BACKGROUND

With the development of display technology, glasses-free three dimensional (3D) display panels have been increasingly applied in the applications such as mobile phones or tablet PCs and other electronic products. A user can watch 3D images on a glasses-free 3D display panel without wearing 3D glasses. For example, the glasses-free 3D display panel may include a display panel and a grating panel provided on a light exiting side of the display panel. The display panel may display glasses-free 3D images in cooperation with the grating panel.

In the related art, the display panel includes an array substrate and a color film substrate which are formed as a cell assembly, and liquid crystals between the array substrate and the color film substrate. The grating panel includes a first substrate and a second substrate, and liquid crystals between the first substrate and the second substrate. The first substrate includes a first base substrate and one sheet-shaped first gating electrode formed on the first base substrate. The second substrate includes a second base substrate and a plurality of strip-shaped second gating electrodes formed on the second base substrate. An orthographic projection region of each of the second gating electrodes on the first base substrate is inside an orthographic projection region of the first gating electrode on the first base substrate. When the glasses-free 3D display panel is controlled to display a glasses-free 3D image, firstly, the display panel is controlled to display a two-dimensional image; then, a voltage is respectively input to the first gating electrode and each of the second gating electrodes, such that the liquid crystals between the first gating electrode and the second gating electrodes are deflected under the action of the voltage, and the liquid crystals not disposed between the first gating electrode and the second gating electrodes are not deflected. At this time, the grating panel blocks part of the two-dimensional image displayed on the display panel, such that the glasses-free three dimensional display panel displays a glasses-free three dimensional image.

In the related art, since the glasses-free three dimensional display panel cannot display a glasses-free three dimensional image and a two dimensional image at the same time, the display function of the glasses-free three dimensional display panel is monotonous.

SUMMARY

In a first aspect, there is provided a glasses-free three dimensional display panel, including a display panel and a grating panel disposed on a light exiting side of the display panel, wherein the grating panel includes a first substrate and a second substrate disposed opposite to each other, and liquid crystals disposed between the first substrate and the second substrate; and the first substrate includes a first base substrate and an electrode pattern disposed on the first base substrate, the electrode pattern includes at least two first gating electrodes, and the second substrate includes a second base substrate and at least two second gating electrodes disposed on the second base substrate.

In one embodiment, at least one first touch electrode is disposed on the first base substrate, an insulation layer is disposed on the first base substrate disposed with the at least one first touch electrode; an electrode pattern is disposed on the first base substrate disposed with the insulation layer, the electrode pattern further includes at least one second touch electrode; and the first gating electrodes do not touch the second touch electrode, and an orthographic projection region of the first touch electrode on the first base substrate is at least partially overlapped with an orthographic projection region of the second touch electrode on the first base substrate.

In one embodiment, an orthographic projection region of the second touch electrode on the first base substrate is not overlapped with an orthographic projection region of the first gating electrode on the first base substrate.

In one embodiment, the orthographic projection region of the first gating electrode on the first base substrate is completely overlapped with an orthographic projection region of the second gating electrode on the first base substrate.

In one embodiment, each of the first gating electrode and the second gating electrode is of a strip shape, and the lengthwise direction of the first gating electrode is parallel to the lengthwise direction of the second gating electrode.

In one embodiment, each of the first touch electrode and the second touch electrode is of a strip shape, and the lengthwise direction of the first touch electrode has an angle with respect to the lengthwise direction of the second touch electrode.

In one embodiment, one second touch electrode is disposed between any two adjacent first gating electrodes, and one first gating electrode is disposed between any two adjacent second touch electrodes.

In one embodiment, a material of the insulation layer is the same as that of the base substrate.

In one embodiment, each of the first gating electrodes and each of the second gating electrodes are connected to a gating control unit, and each of the first touch electrode and each of the second touch electrode are connected to a touch control unit.

In one embodiment, the display panel includes an array substrate and a color film substrate disposed to be opposite to each other, and liquid crystals disposed between the array substrate and the color film substrate.

In a second aspect, there is provided a manufacturing method of a glasses-free three dimensional display panel, including:

manufacturing a display panel;

manufacturing a grating panel, the grating panel including a first substrate and a second substrate formed as a cell assembly, and liquid crystals disposed between the first substrate and the second substrate; and disposing the grating panel at a light exiting side of the display panel, to obtain the glasses-free three dimensional display panel, wherein the first substrate includes a first base substrate and an electrode pattern disposed on the first base substrate, the electrode pattern includes at least two first gating electrodes, and the second substrate includes a second base substrate and at least two second gating electrodes on the second base substrate.

In one embodiment, manufacturing a grating panel includes:

forming at least one first touch electrode on the first base substrate;

forming an insulation layer on the first base substrate formed with the at least one first touch electrode;

forming an electrode pattern on the first base substrate formed with the insulation layer, the electrode pattern further including at least one second touch electrode;

wherein the first gating electrodes do not touch the second touch electrode, and an orthographic projection region of the first touch electrode on the first base substrate is at least partially overlapped with an orthographic projection region of the second touch electrode on the first base substrate.

In one embodiment, the first gating electrodes and the second touch electrode are formed in the same layer.

In one embodiment, after the grating panel is manufactured, the method further includes:

connecting each of the first gating electrodes and each of the second gating electrodes to a gating control unit; and connecting each of the first touch electrode and each of the second touch electrode to a touch control unit.

In a third aspect, there is provided a glasses-free three dimensional display device including the glasses-free three dimensional display panel described in the first aspect.

In one embodiment, at least one first touch electrode is disposed on the first base substrate, an insulation layer is disposed on the first base substrate disposed with the at least one first touch electrode; an electrode pattern is disposed on the first base substrate disposed with the insulation layer, the electrode pattern further includes at least one second touch electrode; and the first gating electrodes do not touch the second touch electrode, and an orthographic projection region of the first touch electrode on the first base substrate is at least partially overlapped with an orthographic projection region of the second touch electrode on the first base substrate.

In one embodiment, an orthographic projection region of the second touch electrode on the first base substrate is not overlapped with an orthographic projection region of the first gating electrode on the first base substrate.

In one embodiment, the orthographic projection region of the first gating electrode on the first base substrate is completely overlapped with an orthographic projection region of the second gating electrode on the first base substrate.

In one embodiment, each of the first gating electrode and the second gating electrode is of a strip shape, and the lengthwise direction of the first gating electrode is parallel to the lengthwise direction of the second gating electrode.

In one embodiment, each of the first touch electrode and the second touch electrode is of a strip shape, and the lengthwise direction of the first touch electrode has an angle with respect to the lengthwise direction of the second touch electrode.

BRIEF DESCRIPTION OF THE DRAWINGS

In order to more clearly illustrate the technical solution in the embodiments of the present disclosure, the drawings, which are intended to be used in the description of the embodiments, will be briefly described below. It will be apparent that the drawings in the following description are merely examples of the present disclosure, and other drawings may be obtained by those skilled in the art without making creative work.

DETAILED DESCRIPTION

In order to make the objectives, technical solutions and advantages clearer, hereinafter the embodiments of the present disclosure will be further described in detail in conjunction with the accompanying drawings.

Figure 1:
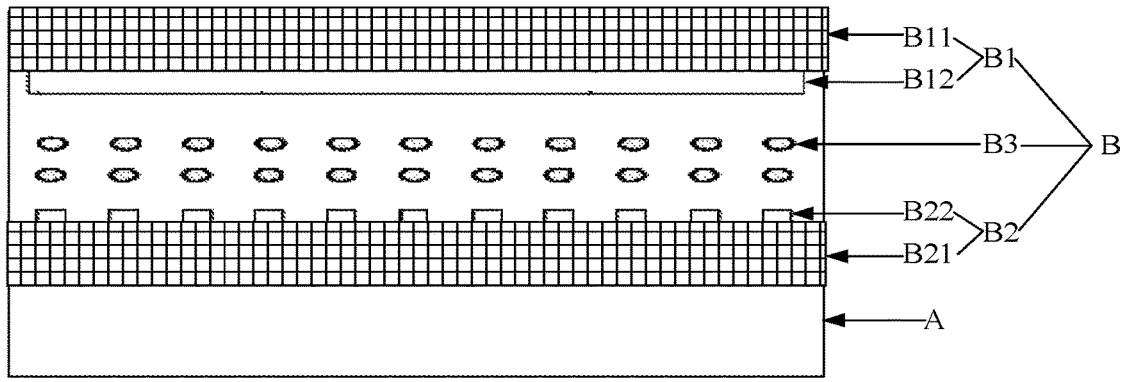
FIG. 1 is a structural schematic diagram of a glasses-free three dimensional display panel in the related art.

FIG. 1 is a structural schematic diagram of a glasses-free three dimensional display panel 1 in the related art. As shown in FIG. 1, the glasses-free three dimensional display panel 1 includes a display panel A and a grating panel B. The display panel A includes an array substrate and a color film substrate disposed opposite to each other, and liquid crystals disposed between the array substrate and the color film substrate. The grating panel B includes a substrate B1 and a second substrate B2, and liquid crystals B3 disposed between the substrate B1 and the second substrate B2. The first substrate B1 includes a first base substrate B11 and one sheet-shaped first gating electrode B12 formed on the first base substrate B11. The second substrate B2 includes a second base substrate B21 and a plurality of strip-shaped second gating electrodes B22 formed on the second base substrate B21, and an orthographic projection region of each of the second gating electrodes B22 on the first base substrate B11 is inside an orthographic projection region of the first gating electrode B12 on the first base substrate B11.

Figure 2:
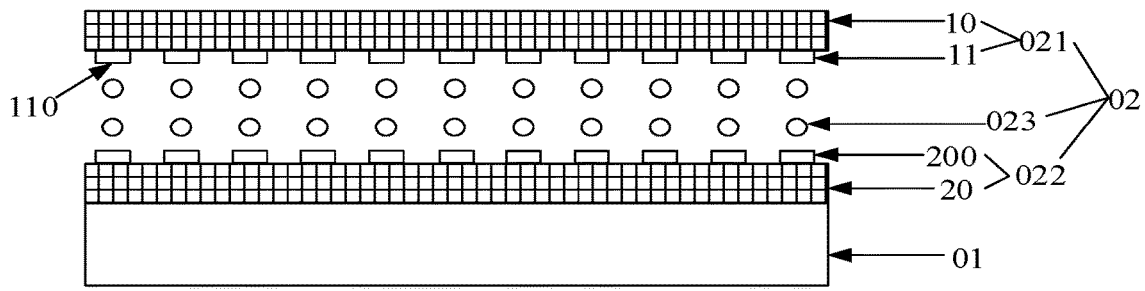
FIG. 2 is a structural schematic diagram of a glasses-free three dimensional display panel according to an embodiment of the present disclosure.

As shown in FIG. 2, an embodiment of the present disclosure provides a glasses-free three dimensional display panel 0. The glasses-free three dimensional display panel 0 includes a display panel 01 and a grating panel 02 disposed on a light exiting side of the display panel 01.

The grating panel 02 may include a first substrate 021 and a second substrate 022 disposed opposite to each other, and liquid crystals 023 disposed between the first substrate 021 and the second substrate 022.

The first substrate 021 includes a first base substrate 10 and an electrode pattern 11 disposed on the first base substrate 10. The electrode pattern 11 includes at least two first gating electrodes 110. The second substrate 022 includes a second base substrate 20 and at least two second gating electrodes 200 disposed on the second base substrate 20.

In summary, the embodiment of the present disclosure provides a glasses-free three dimensional display panel. Since in the glasses-free three dimensional display panel, the first substrate in the grating panel includes at least two first gating electrodes and the second substrate includes at least two second gating electrodes, voltage may be applied to each of the first gating electrodes and each of the second gating electrodes when the glasses-free three dimensional display panel is required to display a glasses-free three dimensional image. When the glasses-free three dimensional display panel is required to display a two-dimensional image and a glasses-free three dimensional image at the same time, voltage may be applied to part of the first gating electrodes and on part of the second gating electrodes, such that in the glasses-free three dimensional display panel, the region where the first gating electrode and the second gating electrode are applied with voltage at the same time displays a glasses-free three dimensional image, and a region where no voltage is applied displays a two dimensional image. Thus, an effect of displaying a glasses-free three dimensional image and a two dimensional image at the same time is achieved, and the display function of the glasses-free three dimensional display panel is enriched.

As an example, the orthographic projection region of the first gating electrode 110 on the first base substrate 10 may be overlapped with the orthographic projection region of the second gating electrode 200 on the first base substrate 10. Further, the orthographic projection region of the first gating electrode 110 on the first base substrate 10 may be completely overlapped with the orthographic projection region of the second gating electrode 200 on the first base substrate 10. In this case, after voltage is applied to the first gating electrode 110 and the second gating electrode 200, the first gating electrode 110 and the second gating electrode 200 form a vertical electrical field with a direction perpendicular to the first substrate. The liquid crystals inside the vertical electrical field may be deflected under the effect of the vertical electrical field. In addition, it is possible that the orthographic projection region of the first gating electrode 110 on the first base substrate 10 is not overlapped with the orthographic projection region of the second gating electrode 200 on the first base substrate 10. In this case, after voltage is applied to the first gating electrode 110 and the second gating electrode 200, the first gating electrode 110 and the second gating electrode 200 may form an inclined electrical field with a direction at an angle with respect to the first substrate, and the liquid crystals inside the inclined electrical field may be deflected under the effect of the inclined electrical field.

Figure 3:
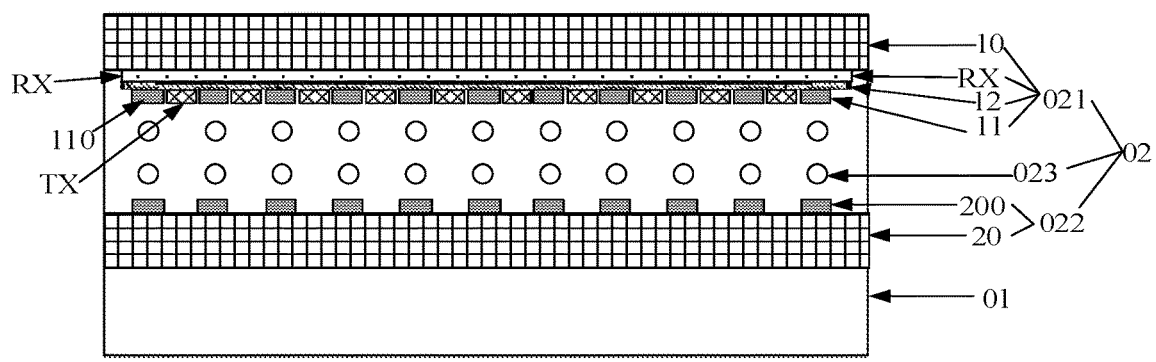
FIG. 3 is a structural schematic diagram of another glasses-free three dimensional display panel according to an embodiment of the present disclosure.

In one embodiment, FIG. 3 is a structural schematic diagram of another glasses-free three dimensional display panel 0 according to an embodiment of the present disclosure. As shown in FIG. 3, based on FIG. 2, at least one first touch electrode RX is disposed on the first base substrate 10. An insulation layer 12 is disposed on the first base substrate 10 disposed with the at least one first touch electrode RX. An electrode pattern 11 is disposed on the first base substrate 10 disposed with the insulation layer 12. The electrode pattern 11 may also include at least one second touch electrode TX. That is, the electrode pattern 11 may include at least one second touch electrode TX and at least two first gating electrodes 110. The first gating electrodes 110 do not touch the second touch electrode TX, and the orthographic projection region of the first touch electrode 110 on the first base substrate 10 is at least partially overlapped with the orthographic projection region of the second touch electrode TX on the first base substrate 10.

In one embodiment, it is possible that the orthographic projection region of the second touch electrode TX on the first base substrate 10 is not overlapped with the orthographic projection region of the first gating electrode 110 on the first base substrate 10. In one embodiment, the orthographic projection region of the second touch electrode TX on the first base substrate 10 may also be not overlapped with the orthographic projection region of the second gating electrode 200 on the first base substrate 10. The orthographic projection region of the first gating electrode 110 on the first base substrate 10 may be completely overlapped with the orthographic projection region of the second gating electrode 200 on the first base substrate 10.

Figure 4:
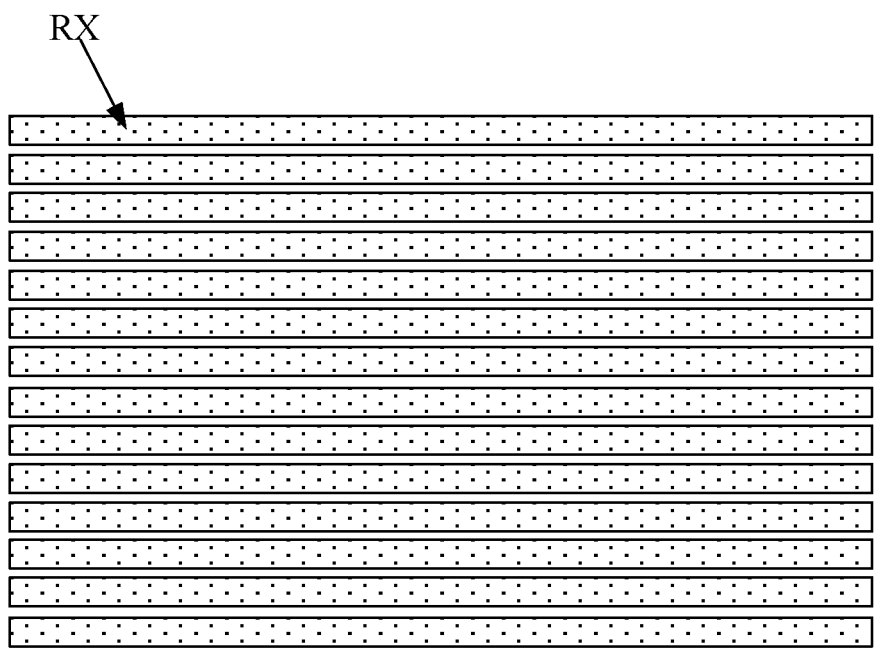
FIG. 4 is a structural schematic diagram of a first touch electrode according to an embodiment of the present disclosure.

As an example, FIG. 4 is a structural schematic diagram of a first touch electrode RX according to an embodiment of the present disclosure. As shown in FIG. 4, a plurality of strip-shaped electrodes (first touch electrodes RX) may be disposed on the first base substrate, and the plurality of first touch electrodes RX are arranged in parallel along a first direction.

Figure 5:
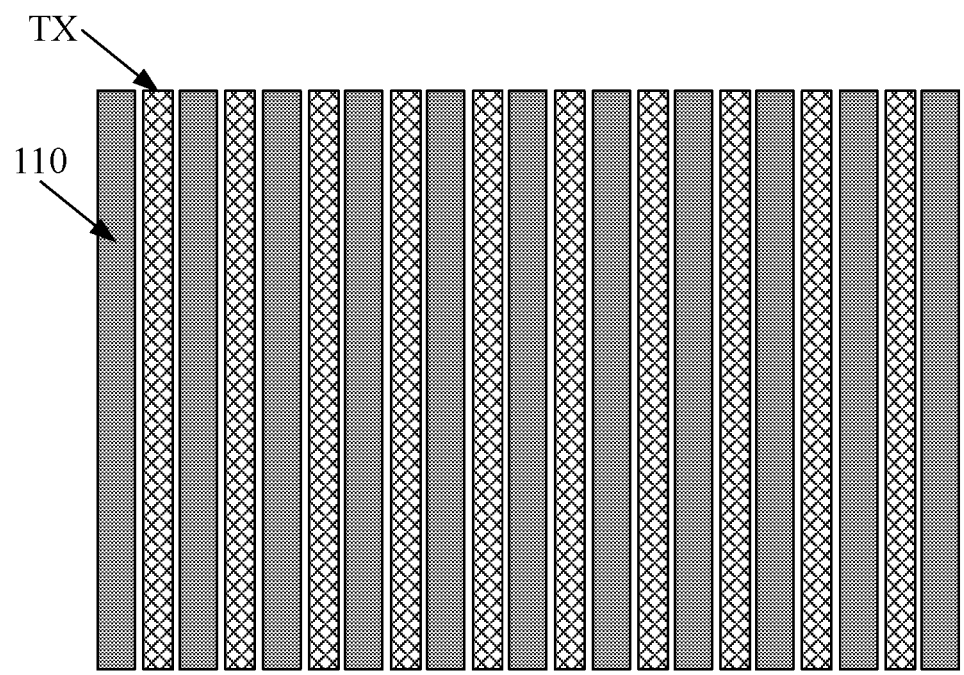
FIG. 5 is a structural schematic diagram of an electrode pattern according to an embodiment of the present disclosure.

FIG. 5 is a structural schematic diagram of an electrode pattern 11 provided by an embodiment of the present disclosure. As shown in FIG. 5, the electrode pattern 11 may include a plurality of strip-shaped electrodes (including first gating electrodes 110 and second touch electrodes TX) arranged in parallel along a second direction. One second touch electrode TX is disposed between any two adjacent first gating electrodes 110, and one first gating electrode 110 is disposed between any two adjacent second touch electrodes TX. That is, the plurality of first gating electrodes 110 and the plurality of second touch electrodes TX are alternately arranged.

As an example, the lengthwise direction (the second direction) of the first gating electrode may be parallel to the lengthwise direction of the second gating electrode, and be parallel to the lengthwise direction (the second direction) of the second touch electrode. The lengthwise direction (the first direction) of the first touch electrode has an angle with respect to the lengthwise direction (the second direction) of the second touch electrode. Preferably, the lengthwise direction of the first touch electrode may be perpendicular to the lengthwise direction of the second touch electrode. In the related art, to implement the touch function of the glasses-free three dimensional display panel, a touch panel has to be disposed at the light exiting side of the grating panel, which makes the glasses-free three dimensional display panel thicker. In the embodiment of the present disclosure, the touch panel is directly integrated in the grating panel, it may reduce the thickness of the glasses-free three dimensional display panel while implementing the touch function of the glasses-free three dimensional display panel.

On one hand, in the embodiment of the present disclosure, the material of the insulation layer may be the same as the material of the base substrate. That is, the insulation layer is also the base substrate. In this case, the insulation layer, the electrode patter, the liquid crystals, the second gating electrodes and the second base substrate may form a grating panel. The grating panel differs from that in the related art in that, in the embodiment of the present disclosure, an electrode pattern is disposed on the insulation layer (equivalent to the base substrate), while in the related art, one sheet-shaped gating electrode is disposed on the base substrate. The first base substrate and the first touch electrode may form a touch panel, and the touch panel has eliminated one base substrate, an insulation layer and a second touch electrode compared with the touch panel in the related art. Therefore, the touch panel, the grating panel and the display panel provided by the embodiment of the present disclosure are laminated to obtain a glasses-free three dimensional display panel with reduced thickness.

On the other hand, in an embodiment of the present disclosure, the material of the insulation layer may be different from the material of the base substrate. In this case, the first base substrate, the first touch electrodes, the insulation layer, the electrode pattern, the liquid crystals, the second gating electrodes and the second base substrate may also form a glasses-free three dimensional display panel with reduced thickness.

Figure 6:
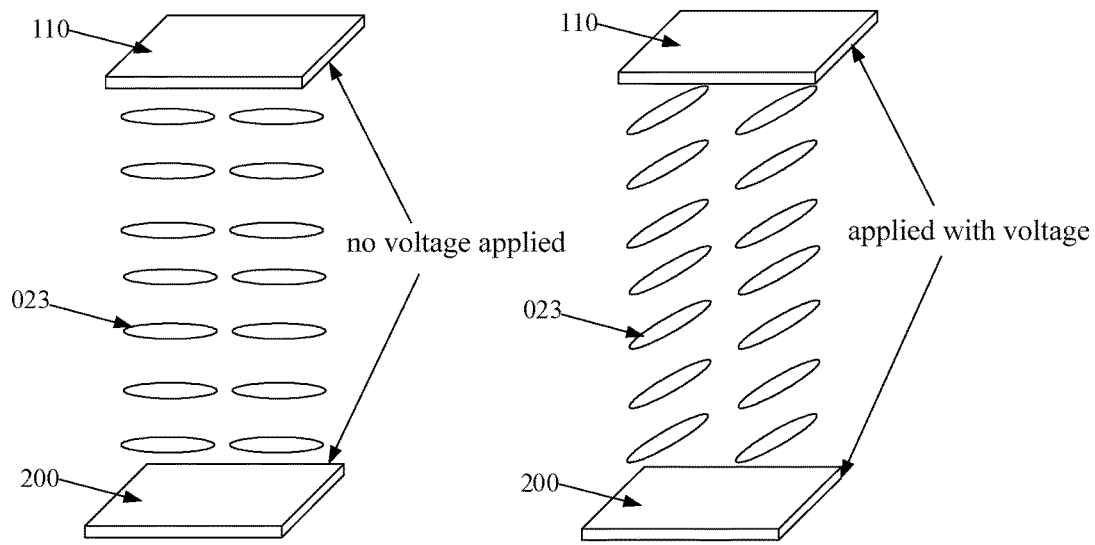
FIG. 6 is a schematic diagram of deflection of liquid crystals according to an embodiment of the present disclosure.

Further, each of the first gating electrodes and each of the second gating electrodes may be connected to a gating control unit. Each of the first touch electrodes and each of the second touch electrodes may be connected to a touch control unit. When the glasses-free three dimensional display panel is controlled to display a three dimensional image, as shown in FIG. 6, the gating control unit may be controlled to apply different voltages to part of the first gating electrodes 110 and to the corresponding second gating electrodes 200, such that the liquid crystals 023 between the first gating electrodes 110 and the second gating electrodes 200 which have been applied with voltages are deflected under the effect of the voltage difference. At this time, the deflected liquid crystals 023 may block the light emitted from the display panel. It should be noted that, the liquid crystals 023 between the first gating electrodes 110 and the corresponding second gating electrodes 200 which are not applied with voltage will not be deflected, and the liquid crystals 023 that are not effectively deflected may not block the light emitted from the display panel, therefore, a grating with alternating bright and dark regions may be presented. The user may see a three dimensional image from the light exiting side of the grating, such that the glasses-free three dimensional display panel may display a three dimensional image. When the glasses-free three dimensional display panel is controlled to implement the touch function, the touch control unit may be controlled to input a voltage to the second touch electrodes, and collect sensed voltage from the first touch electrodes, to implement the touch function of the three dimensional display panel. As an example, the gating control unit may input different voltages lower than 3 V to the first gating electrodes and the second gating electrodes, and touch control unit may input a voltage higher than 3 V to the second touch electrodes.

It should be noted that, as shown in FIG. 3, liquid crystals 023 are disposed under each of the first gating electrodes 110. An alignment layer (not shown in FIG. 3) may also be disposed at a side of the second gating electrodes 200 approximate to the first gating electrodes 110 on the second base substrate 20. An alignment layer may also be disposed at a side of the first gating electrodes 110 approximate to the second gating electrodes 200 on the first base substrate 10. Liquid crystals 023 are disposed between the two alignment layers. Under the effect of the two alignment layers, the liquid crystals 023 may present the arrangement as shown in FIG. 3. It should be noted that, no alignment layer is disposed at a side of the second touch electrode TX approximate to the second gating electrodes 200 on the first base substrate 10. When voltage is applied on the first gating electrodes 110 and the second gating electrodes 200, the liquid crystals between the first gating electrodes 110 and the second gating electrodes 200 may be effectively deflected under the effect of the electrical field and the alignment layers, and the liquid crystals between the second touch electrodes TX and the second gating electrodes 200 cannot be effectively deflected.

Further, in an embodiment of the present disclosure, the time period for implementing the touch function of the glasses-free three dimensional display panel may be different from the time period for implementing the display function of the glasses-free three dimensional display panel. That is, the touch control unit and the gating control unit may operate in different time periods.

Figure 7:
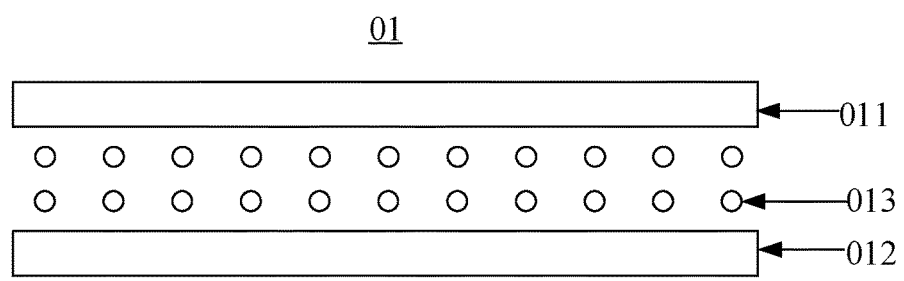
FIG. 7 is a structural schematic diagram of a display panel according to an embodiment of the present disclosure.

As shown in FIG. 7, the display panel 01 may include an array substrate 011 and a color film substrate 012 disposed to be opposite to each other and liquid crystals 013 disposed between the array substrate 011 and the color film substrate 012. That is, the display panel 01 may be exactly the same as the liquid crystal display panel in the related art. In one embodiment, the display panel may also not be a liquid crystal display (LCD) panel, or may be an organic light-emitting diode display (OLED) panel. In conclusion, the display panel 01 may be a display panel has a function of displaying a two dimensional image. In one embodiment, the material for all of the electrodes may be indium tin oxide (ITO).

In summary, an embodiment of the present disclosure provides a glasses-free three dimensional display panel. Since in the glasses-free three dimensional display panel, the first substrate in the grating panel includes at least two first gating electrodes and the second substrate includes at least two second gating electrodes, voltage may be applied to each of the first gating electrodes and each of the second gating electrodes when the glasses-free three dimensional display panel is required to display a glasses-free three dimensional image. When the glasses-free three dimensional display panel is required to display a two-dimensional image and a glasses-free three dimensional image at the same time, voltage may be applied to part of the first gating electrodes and to part of the second gating electrodes, such that in the glasses-free three dimensional display panel, the region where the first gating electrode and the second gating electrode are applied with voltage at the same time displays a glasses-free three dimensional image, and a region where no voltage is applied displays a two dimensional image. Thus, it may achieve an effect of displaying a glasses-free three dimensional image and a two dimensional image at the same time, and enrich the display function of the glasses-free three dimensional display panel.

Figure 8:
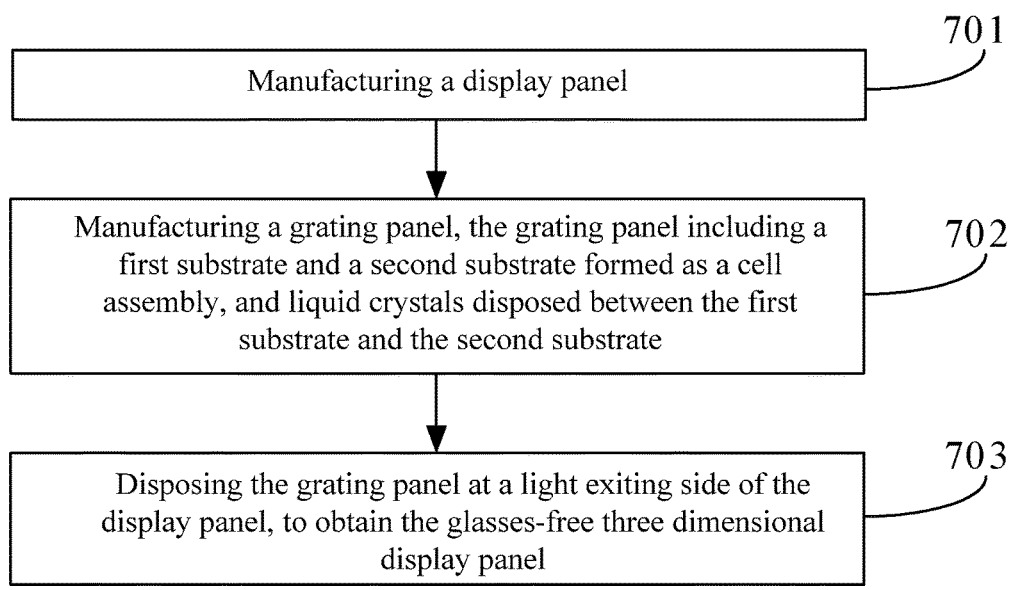
FIG. 8 is a flow chart of a manufacturing method of a glasses-free three dimensional display panel according to an embodiment of the present disclosure.

As shown in FIG. 8, an embodiment of the present disclosure provides a manufacturing method of a glasses-free three dimensional display panel. The manufacturing method of the glasses-free three dimensional display panel may be used to manufacture the glasses-free three dimensional display panel as shown in FIG. 2 or FIG. 3. The manufacturing method of the glasses-free three dimensional display panel may include the following steps.

At step 701, a display panel is manufactured.

At step 702, a grating panel is manufactured. The grating panel includes a first substrate and a second substrate which are formed as a cell assembly, and liquid crystals disposed between the first substrate and the second substrate.

The first substrate includes a first base substrate and an electrode pattern disposed on the first base substrate. The electrode pattern includes at least two first gating electrodes. The second substrate includes a second base substrate and at least two second gating electrodes on the second base substrate.

At step 703, the grating panel is disposed at the light exiting side of the display panel to obtain a glasses-free three dimensional display panel.

In summary, the embodiment of the present disclosure provides a manufacturing method of the glasses-free three dimensional display panel. Since in the glasses-free three dimensional display panel manufactured by the manufacturing method, the first substrate in the grating panel includes at least two first gating electrodes and the second substrate includes at least two second gating electrodes, voltage may be applied on each of the first gating electrodes and each of the second gating electrodes when the glasses-free three dimensional display panel is required to display a glasses-free three dimensional image. When the glasses-free three dimensional display panel is required to display a two-dimensional image and a glasses-free three dimensional image at the same time, voltage may be applied on part of the first gating electrodes and on part of the second gating electrodes, such that in the glasses-free three dimensional display panel, the region where the first gating electrode and the second gating electrode are applied with voltage at the same time displays a glasses-free three dimensional image, and a region where no voltage is applied displays a two dimensional image. Thus, it may achieve an effect of displaying a glasses-free three dimensional image and a two dimensional image at the same time, and enrich the display function of the glasses-free three dimensional display panel.

As an example, as shown in FIG. 2, the orthographic projection region of the first gating electrode 110 on the first base substrate 10 may be overlapped with the orthographic projection region of the second gating electrode 200 on the first base substrate 10. Further, the orthographic projection region of the first gating electrode 110 on the first base substrate 10 may be completely overlapped with the orthographic projection region of the second gating electrode 200 on the first base substrate 10. In this case, after voltage is applied to the first gating electrode 110 and the second gating electrode 200, the first gating electrode 110 and the second gating electrode 200 form a vertical electrical field with a direction perpendicular to the first substrate. The liquid crystals inside the vertical electrical field may be deflected under the effect of the vertical electrical field. In addition, it is possible that the orthographic projection region of the first gating electrode 110 on the first base substrate 10 is not overlapped with the orthographic projection region of the second gating electrode 200 on the first base substrate 10. In this case, after voltage is applied to the first gating electrode 110 and the second gating electrode 200, the first gating electrode 110 and the second gating electrode 200 may form an inclined electrical field with a direction at an angle with respect to the first substrate, and the liquid crystals inside the inclined electrical field may be deflected under the effect of the inclined electrical field.

Figure 9A:
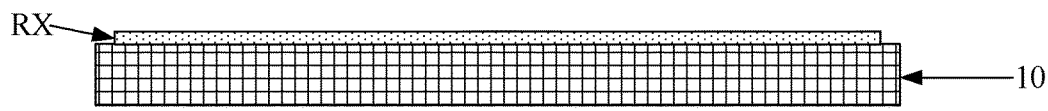
FIG. 9A is a partial structural schematic diagram of a grating panel provided by an embodiment of the present disclosure.

In one embodiment, as shown in FIG. 9A, at step 702, when the grating panel is manufactured, firstly, an electrode material layer may be formed on the first base substrate 10. Then, the electrode material layer is processed using one patterning process, to obtain at least one first touch electrode RX as shown in FIG. 9A.

Figure 9B:
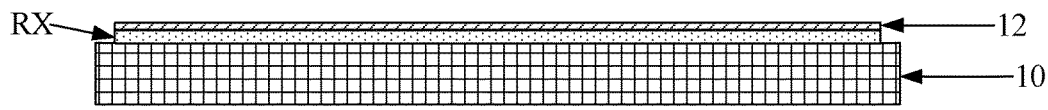
FIG. 9B is a partial structural schematic diagram of another grating panel according to an embodiment of the present disclosure.
Figure 9C:
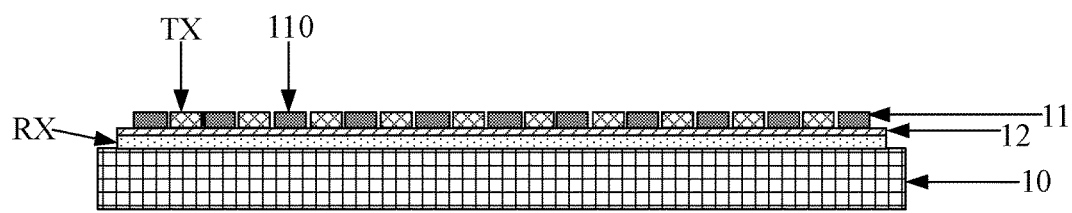
FIG. 9C is a partial structural schematic diagram of yet another grating panel according to an embodiment of the present disclosure.

Then, as shown in FIG. 9B, after the first touch electrode RX is formed, an insulation layer 12 may be formed on the first base substrate 10 formed with the at least one first touch electrode RX. After the insulation layer 12 is formed, as shown in FIG. 9C, an electrode material layer is again formed on the first base substrate 10 formed with the insulation layer 12. Then, the electrode material layer is processed with one patterning process, to obtain an electrode pattern 11. As an example, the electrode pattern 11 may include at least two first gating electrodes 110 and at least one second touch electrode TX. The first gating electrodes 110 and the second touch electrode TX may be formed in the same layer. The first gating electrodes 110 and the second touch electrode TX may be formed of the same material. The first gating electrodes 110 do not touch the second touch electrode TX. The orthographic projection region of the first touch electrode 110 on the first base substrate 10 is at least partially overlapped with the orthographic projection region of the second touch electrode TX on the first base substrate 10.

Finally, a second gating electrode may be formed on the second base substrate, and the first base substrate and the second base substrate are disposed opposite to each other. Liquid crystals are filled between the electrode pattern and the second gating electrode, to obtain the grating panel as shown in FIG. 3.

Specifically, it is possible that the orthographic projection region of the second touch electrode on the first base substrate is not overlapped with the orthographic projection region of the first gating electrode on the first base substrate. In one embodiment, the orthographic projection region of the second touch electrode on the first base substrate may also be not overlapped with the orthographic projection region of the second gating electrode on the first base substrate. The orthographic projection region of the first gating electrode on the first base substrate may be completely overlapped with the orthographic projection region of the second gating electrode 200 on the first base substrate. Each of the first gating electrode and the second gating electrode is of a strip shape, and the lengthwise direction of the first gating electrode is parallel to the lengthwise direction of the second gating electrode. Each of the first touch electrode and the second touch electrode is of a strip shape, and the lengthwise direction of the first touch electrode has an angle with respect to the lengthwise direction of the second touch electrode. In one embodiment, the lengthwise direction of the first touch electrode may be perpendicular to the lengthwise direction of the second touch electrode. One second touch electrode is disposed between two adjacent first gate electrodes, and one first touch electrode is disposed between any adjacent two gate electrodes.

On one hand, in an embodiment of the present disclosure, the material of the insulation layer may be the same as the material of the base substrate. That is, the insulation layer is also the base substrate. When the insulation layer 12 is formed as shown in FIG. 9C, the insulation layer may be directly covered on the first touch electrode RX. In this case, the insulation layer, the electrode patter, the liquid crystals, the second gating electrodes and the second base substrate may form a grating panel. The grating panel differs from that in the related art in that, in the embodiment of the present disclosure, an electrode pattern is formed on the insulation layer (equivalent to the base substrate), while in the related art, one sheet-shaped gating electrode is formed on the base substrate. The first base substrate and the first touch electrode may form a touch panel, and the touch panel has eliminated one base substrate, one insulation layer and one second touch electrode compared with the touch panel in the related art. Therefore, the touch panel, the grating panel and the display panel provided by the embodiment of the present disclosure are laminated to obtain a glasses-free three dimensional display panel with reduced thickness.

On the other hand, in an embodiment of the present disclosure, the material of the insulation layer may be different from the material of the base substrate. When the insulation layer 12 is formed as shown in FIG. 9C, the insulation layer 12 may be directly formed on the first touch electrode RX by coating or sputtering. In this case, the first base substrate, the first touch electrodes, the insulation layer, the electrode pattern, the liquid crystals, the second gating electrodes and the second base substrate may also form a glasses-free three dimensional display panel with reduced thickness.

Further, after the grating panel is manufactured at step 702, the manufacturing method of the glasses-free three dimensional display panel may also include: connecting each of the first gating electrodes and each of the second gating electrodes to a gating control unit; and connecting each of the first touch electrodes and each of the second touch electrodes to a touch control unit.

Specifically, as shown in FIG. 7, the display panel 01 may include an array substrate 011 and a color film substrate 012 which are formed as a cell assembly and liquid crystals 013 disposed between the array substrate 011 and the color film substrate 012. That is, the display panel 01 may be exactly the same as the liquid crystal display panel in the related art. When the display panel is manufactured at step 701, the array substrate and the color film substrate may be separately manufactured. Then, the array substrate and the color film substrate are formed as a cell assembly, and liquid crystals are injected between the array substrate and the color film substrate, to obtain the display panel. In one embodiment, the display panel may also not be a liquid crystal display (LCD) panel, or may be an organic light-emitting diode display (OLED) panel. In conclusion, the display panel 01 may be a display panel has a function of displaying a two dimensional image.

It should be noted that, as shown in FIG. 3, liquid crystals 023 are disposed under each of the first gating electrodes 110. An alignment layer (not shown in FIG. 3) may also be disposed at a side of the second gating electrodes 200 approximate to the first gating electrodes 110 on the second base substrate 20. An alignment layer may also be disposed at a side of the first gating electrodes 110 approximate to the second gating electrodes 200 on the first base substrate 10. Liquid crystals 023 are disposed between the two alignment layers. Under the effect of the two alignment layers, the liquid crystals 023 may present the arrangement as shown in FIG. 3. It should be noted that, no alignment layer is disposed at a side of the second touch electrode TX approximate to the second gating electrodes 200 on the first base substrate 10. When voltage is applied on the first gating electrodes 110 and the second gating electrodes 200, the liquid crystals between the first gating electrodes 110 and the second gating electrodes 200 may be effectively deflected under the effect of the electrical field and the alignment layers, and the liquid crystals between the second touch electrodes TX and the second gating electrodes 200 cannot be effectively deflected.

In summary, an embodiment of the present disclosure provides a manufacturing method of the glasses-free three dimensional display panel. Since in the glasses-free three dimensional display panel manufactured by the method, the first substrate in the grating panel includes at least two first gating electrodes and the second substrate includes at least two second gating electrodes, voltage may be applied on each of the first gating electrodes and each of the second gating electrodes when the glasses-free three dimensional display panel is required to display a glasses-free three dimensional image. When the glasses-free three dimensional display panel is required to display a two-dimensional image and a glasses-free three dimensional image at the same time, voltage may be applied to part of the first gating electrodes and to part of the second gating electrodes, such that in the glasses-free three dimensional display panel, the region where the first gating electrode and the second gating electrode are applied with voltage at the same time displays a glasses-free three dimensional image, and a region where no voltage is applied displays a two dimensional image. Thus, it may achieve an effect of displaying a glasses-free three dimensional image and a two dimensional image at the same time, and enrich the display function of the glasses-free three dimensional display panel.

An embodiment of the present disclosure provides a glasses-free three dimensional display device, which may include a glasses-free three dimensional display panel 0 as shown in FIG. 2 or 3. The glasses-free three dimensional display device may be an electronic paper, a mobile phone, a tablet PC, a television, a monitor, a laptop computer, a digital photo album, a navigator, and any display product or component which has display function.

In summary, an embodiment of the present disclosure provides a glasses-free three dimensional display device. Since in the glasses-free three dimensional display panel of the glasses-free three dimensional display device, the first substrate in the grating panel includes at least two first gating electrodes and the second substrate includes at least two second gating electrodes, voltage may be applied on each of the first gating electrodes and each of the second gating electrodes when the glasses-free three dimensional display panel is required to display a glasses-free three dimensional image. When the glasses-free three dimensional display panel is required to display a two-dimensional image and a glasses-free three dimensional image at the same time, voltage may be applied on part of the first gating electrodes and on part of the second gating electrodes, such that in the glasses-free three dimensional display panel, the region where the first gating electrode and the second gating electrode are applied with voltage at the same time displays a glasses-free three dimensional image, and a region where no voltage is applied displays a two dimensional image. Thus, it may achieve an effect of displaying a glasses-free three dimensional image and a two dimensional image at the same time, and enrich the display function of the glasses-free three dimensional display panel.

It will be apparent to those skilled in the art that, for the convenience and simplicity of the description, the embodiments of the glasses-free three dimensional display panel described above, the manufacturing method of the glasses-free three dimensional display panel and the glasses-free three dimensional display device may be referred to each other, which will not be repeated in the embodiments of the present disclosure.

The foregoing are merely specific embodiments of the present disclosure and are not intended to limit the present disclosure. Those skilled in the art may conceive variations, substitutions or modifications within the spirit and principle of the present disclosure, which should be covered by the protection scope of the present disclosure.

What is claimed is:

1. A glasses-free three dimensional display panel, comprising a display panel and a grating panel disposed on a light exiting side of the display panel, wherein:
    the grating panel comprises a first substrate and a second substrate disposed opposite to each other, and liquid crystals disposed between the first substrate and the second substrate;
    the first substrate comprises a first base substrate and a first electrode pattern disposed on the first base substrate, the first electrode pattern comprises at least two first gating electrodes, and the second substrate comprises a second base substrate and at least two second gating electrodes disposed on the second base substrate;
    each of the first gating electrode and the second gating electrode is a strip shape having a length direction and width direction, where the length direction is longer than the width direction, and where the length direction of the first gating electrode is parallel to the length direction of the second gating electrode; and
    an orthographic projection region of the first gating electrode on the first base substrate is parallel to an orthographic projection region of the second gating electrode on the first base substrate: and
    each of the first gating electrodes and each of the second gating electrodes are individually connected to a gating control unit, and each of a first touch electrode and each of a second touch electrode are individually connected to a touch control unit;
    where the gating control unit is configured to respectively apply corresponding voltages on each of the first gating electrodes and each of the second gating electrodes to display a glasses-free three dimensional image on the glasses-free three dimensional display panel; and
    the gating control unit is configured to apply corresponding voltages to a first portion of the first gating electrodes and a first portion of the second gating electrodes in a first region to display a glasses-free three dimensional image on the glasses-free three dimensional display panel in the first region and not apply voltage to second portion of the first gating electrodes and a second portion of the second gating electrodes in a second region to display a two dimensional image in the second region so that a two-dimensional image and a glasses-free three dimensional image are simultaneously displayed on two dimensional image.

2. The glasses-free three dimensional display panel of claim 1, wherein
    at least one first touch electrode is disposed on the first base substrate, an insulation layer is disposed on the first base substrate disposed with the at least one first touch electrode, a second electrode pattern is disposed on the first base substrate disposed with the insulation layer, and the second electrode pattern further comprises at least one second touch electrode; and
    the first gating electrodes do not touch the second touch electrode, and an orthographic projection region of the first touch electrode on the first base substrate is at least partially overlapped with an orthographic projection region of the second touch electrode on the first base substrate.

3. The glasses-free three dimensional display panel of claim 2, wherein
    the orthographic projection region of the second touch electrode on the first base substrate is not overlapped with an orthographic projection region of the first gating electrode on the first base substrate.

4. The glasses-free three dimensional display panel of claim 3, wherein
    the orthographic projection region of the first gating electrode on the first base substrate is completely overlapped with the orthographic projection region of the second gating electrode on the first base substrate.

5. The glasses-free three dimensional display panel of claim 3, wherein
    each of the first touch electrode and the second touch electrode is of a strip shape, and the length direction of the first touch electrode has an angle with respect to the length direction of the second touch electrode.

6. The glasses-free three dimensional display panel of claim 3, wherein
    one second touch electrode is disposed between any two adjacent first gating electrodes, and one first gating electrode is disposed between any two adjacent second touch electrodes.

7. The glasses-free three dimensional display panel of claim 2, wherein
    a material of the insulation layer is the same as that of the base substrate.

8. The glasses-free three dimensional display panel of claim 1, wherein
    the display panel comprises an array substrate and a color film substrate disposed to be opposite to each other, and liquid crystals disposed between the array substrate and the color film substrate.

9. A manufacturing method of a glasses-free three dimensional display panel, comprising:
    manufacturing a display panel;
    manufacturing a grating panel, the grating panel comprising a first substrate and a second substrate formed as a cell assembly, and liquid crystals disposed between the first substrate and the second substrate; and
    disposing the grating panel at a light exiting side of the display panel, to obtain the glasses-free three dimensional display panel,
    wherein the first substrate comprises a first base substrate and a first electrode pattern disposed on the first base substrate, the first electrode pattern comprises at least two first gating electrodes, and the second substrate comprises a second base substrate and at least two second gating electrodes on the second base substrate;
    each of the first gating electrode and the second gating electrode is a strip shape having a length direction and width direction, where the length direction is longer than the width direction, and where the length direction of the first gating electrode is parallel to the length direction of the second gating electrode; and an orthographic projection region of the first gating electrode on the first base substrate is parallel to an orthographic projection region of the second gating electrode on the first base substrate and
    each of the first gating electrodes and each of the second gating electrodes are individually connected to a gating control unit, and each of a first touch electrode and each of a second touch electrode are individually connected to a touch control unit;
    where the gating control unit is configured to respectively apply corresponding voltages on each of the first gating electrodes and each of the second gating electrodes to display a glasses-free three dimensional image on the glasses-free three dimensional display panel; and the gating control unit is configured to apply corresponding voltages to a first portion of the first gating electrodes and a first portion of the second gating electrodes in a first region to display a glasses-free three dimensional image on the glasses-free three dimensional display panel in the first region and not apply voltage to second portion of the first gating electrodes and a second portion of the second gating electrodes in a second region to display a two dimensional image in the second region so that a two-dimensional image and a glasses-free three dimensional image are simultaneously displayed on two dimensional image.

10. The method of claim 9, wherein manufacturing the grating panel comprises:

forming at least one first touch electrode on the first base substrate;

forming an insulation layer on the first base substrate formed with the at least one first touch electrode;

forming a second electrode pattern on the first base substrate formed with the insulation layer, the second electrode pattern further comprising at least one second touch electrode;

wherein the first gating electrodes do not touch the second touch electrode, and an orthographic projection region of the first touch electrode on the first base substrate is at least partially overlapped with an orthographic projection region of the second touch electrode on the first base substrate.

11. The method of claim 10, wherein
the first gating electrodes and the second touch electrode are formed in the same layer.

12. The method of claim 9, wherein after the grating panel is manufactured, the method further comprises:

connecting each of the first gating electrodes and each of the second gating electrodes to a gating control unit; and connecting each of the first touch electrode and each of the second touch electrode to a touch control unit.

13. A glasses-free three dimensional display device comprising a glasses-free three dimensional display panel, the glasses-free three dimensional display panel comprising a display panel and a grating panel disposed on a light exiting side of the display panel, wherein the grating panel comprises a first substrate and a second substrate disposed opposite to each other, and liquid crystals disposed between the first substrate and the second substrate;

the first substrate comprises a first base substrate and a first electrode pattern disposed on the first base substrate, the first electrode pattern comprises at least two first gating electrodes, and the second substrate comprises a second base substrate and at least two second gating electrodes disposed on the second base substrate;

each of the first gating electrode and the second gating electrode is a strip shape having a length direction and width direction, where the length direction is longer than the width direction, and where the length direction of the first gating electrode is parallel to the length direction of the second gating electrode; and an orthographic projection region of the first gating electrode on the first base substrate is parallel to an orthographic projection region of the second gating electrode on the first base substrate and each of the first gating electrodes and each of the second gating electrodes are individually connected to a gating control unit, and each of a first touch electrode and each of a second touch electrode are individually connected to a touch control unit;

where the gating control unit is configured to respectively apply corresponding voltages on each of the first gating electrodes and each of the second gating electrodes to display a glasses-free three dimensional image on the glasses-free three dimensional display panel; and the gating control unit is configured to apply corresponding voltages to a first portion of the first gating electrodes and a first portion of the second gating electrodes in a first region to display a glasses-free three dimensional image on the glasses-free three dimensional display panel in the first region and not apply voltage to second portion of the first gating electrodes and a second portion of the second gating electrodes in a second region to display a two dimensional image in the second region so that a two-dimensional image and a glasses-free three dimensional image are simultaneously displayed on two dimensional image.

14. The glasses-free three dimensional display device of claim 13, wherein at least one first touch electrode is disposed on the first base substrate, an insulation layer is disposed on the first base substrate disposed with the at least one first touch electrode, a second electrode pattern is disposed on the first base substrate disposed with the insulation layer, and the second electrode pattern further comprises at least one second touch electrode; and the first gating electrodes do not touch the second touch electrode, and an orthographic projection region of the first touch electrode on the first base substrate is at least partially overlapped with an orthographic projection region of the second touch electrode on the first base substrate.

15. The glasses-free three dimensional display device of claim 14, wherein
the orthographic projection region of the second touch electrode on the first base substrate is not overlapped with an orthographic projection region of the first gating electrode on the first base substrate.

16. The glasses-free three dimensional display device of claim 15, wherein
the orthographic projection region of the first gating electrode on the first base substrate is completely overlapped with an orthographic projection region of the second gating electrode on the first base substrate.

17. The glasses-free three dimensional display device of claim 15, wherein
each of the first touch electrode and the second touch electrode is of a strip shape, and the length direction of the first touch electrode has an angle with respect to the length direction of the second touch electrode.

* * * * *